Patented Dec. 26, 1950

2,535,649

UNITED STATES PATENT OFFICE 2,535,649

POLYVINYL COMPOSITIONS OF IMPROVED RESISTANCE TO LIGHT AND PROCESS FOR MAKING THE SAME

Antoine Francisque Gaston Mouchiroud, Lyon, France, assignor to Societe "Rhodiaceta," Paris, France, a corporation of France No Drawing. Application March 27, 1947, Serial No. 737,731. In France May 3, 1945

Section 1, Public Law 690, August 8, 1946
Patent expires May 3, 1965

4 Claims. (Cl. 260—45.7)

The present invention relates to a process for improving the resistance to light of filaments, threads, fibres, artificial horse-hairs, strips, ribbons, rods, fabrics, films, varnishes, foils and in general all objects having a basis of polyvinyl derivatives, which process consists in incorporating substances containing sexavalent chromium in the aforesaid compositions. This incorporation can be carried out at any time either before forming the article or in the course of its manufacture or by treatment of the finished article.

The compounds used according to this invention are particularly active so that very small quantities (of the order of 0.1 to 10 parts per 1000) are generally sufficient. These compounds improve not only the stability of the materials to light but also their stability to heat.

It is obvious that it is important that the compounds should be distributed in a very uniform manner throughout the material so that the protective action is effected in a regular manner throughout the mass to be protected.

The above mentioned incorporation can be produced either by intimate mixture with the polyvinyl derivative before dissolving it, by addition to the solution to be spun or to be cast, or by after-treatment of the object or article as for example by immersing it in a bath containing the protective agent or by sprinkling a liquid containing this agent on the article or object or by any other suitable means.

The objects or articles obtained according to the present invention can if desired be subjected to treatment with any usual additional agents such as white or coloured pigments, natural or synthetic polymers or their derivatives, etc.

The following examples serve to illustrate various methods of carrying out the invention but it is to be understood that they do not limit it in any manner. The parts throughout refer to parts by weight.

*Example 1*

30 parts of polyvinyl chloride
0.15 part of sodium bichromate
35 parts of acetone
35 parts of carbon disulphide are carefully mixed, then spun in the known manner to obtain a thread which after stretching has a metric number of about 90. The sodium bichromate is incorporated in the form of an intimate mixture dispersed with the polyvinyl chloride this mixture containing 1 part of bichromate of sodium for 3 parts of polyvinyl chloride.

Another solution containing:

30 parts of polyvinyl chloride
35 parts of acetone
35 parts of carbon disulphide is likewise spun as a comparison.

The threads obtained are exposed to light behind a glass frame.

The dynamometric qualities are measured before and after prolonged exposure during four months. The degradations are shown in the following table:

|  | Loss of tensile strength | Loss of stretching power |
|---|---|---|
|  | *Percent* | *Percent* |
| Comparison sample | 18 | 16 |
| Thread containing 0.5% of sodium bichromate | 9 | 2 |

*Example 2*

A fabric formed of threads of a copolymer of vinyl chloride and vinyl acetate is soaked in a solution containing:

|  | Grams |
|---|---|
| Potassium bichromate | 2 |
| Acetone | 50 |
| Water | 948 | and then drained in such a manner that it retains 100% of its own weight of liquid. It is then dried and its resistance to light is more than doubled.

*Example 3*

A solution (1) which contains:

7 parts polyvinyl chloride
0.033 part of lithium bichromate
46.5 parts acetone
46.5 parts carbon disulphide is prepared and then this solution is cast in a known manner so as to obtain a regular film.

There is also cast in an identical fashion a solution (2) which contains:

7 parts of polyvinyl chloride
46.5 parts of acetone
46.5 parts of carbon disulphide The two films obtained are then exposed to light. The resistance to light of the film obtained from solution (1) is considerably increased in comparison with that of the film obtained from solution (2).

What I claim and desire to secure by Letters Patent is:

1. Films, filaments, threads, fibres, artificial horse hair, strips, rods, fabrics, varnishes, foils, having a basis of a polyvinylchloride and showing an improved resistance to light, which contain 0.1 to 10 parts per 1000 parts, by weight, of an alkali metal salt of chromic acid.

2. Films, filaments, threads, fibres, artificial horse hair, strips, rods, fabrics, varnishes, foils, having a basis of a polyvinyl chloride and showing an improved resistance to light, which contain 0.1 to 10 parts per 1000 parts, by weight, of sodium bichromate.

3. Films, filaments, threads, fibres, artificial horse hair, strips, rods, fabrics, varnishes, foils, having a basis of a polyvinyl chloride and showing an improved resistance to light, which contain 0.1 to 10 parts per 1000 parts, by weight, of potassium bichromate.

4. Films, filaments, threads, fibres, artificial horse hair, strips, rods, fabrics, varnishes, foils, having a basis of a polyvinyl chloride and showing an improved resistance to light, which contain 0.1 to 10 parts per 1000 parts, by weight, of lithium bichromate.

ANTOINE FRANCISQUE GASTON MOUCHIROUD.

REFERENCES CITED

The following references are of record in the file of this patent:

UNITED STATES PATENTS

| Number | Name | Date |
|---|---|---|
| 2,125,387 | Mason | Aug. 2, 1938 |
| 2,141,126 | Doolittle | Dec. 20, 1938 |
| 2,339,775 | Ether | Jan. 25, 1944 |